United States Patent Office 3,413,107
Patented Nov. 26, 1968

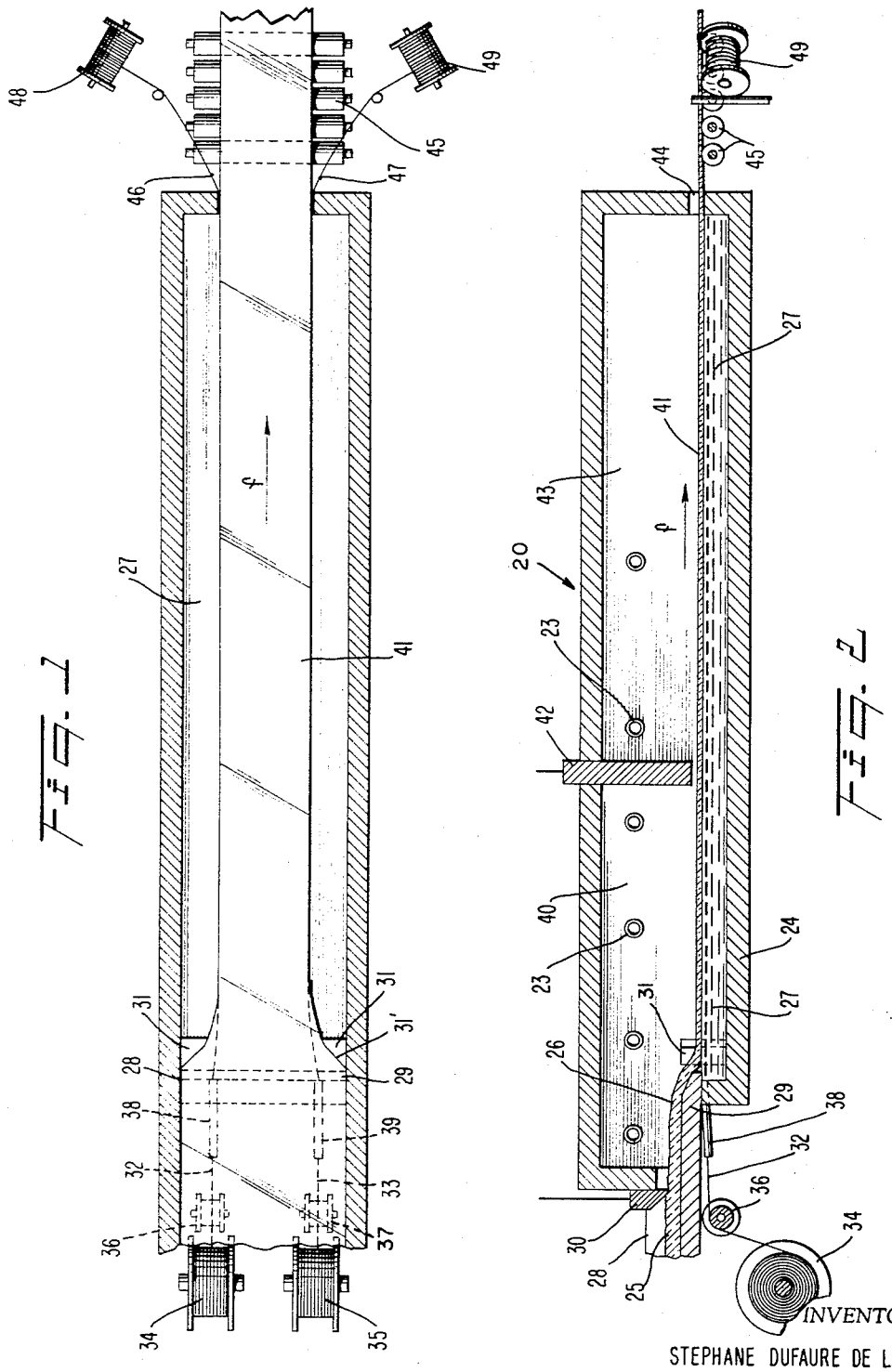

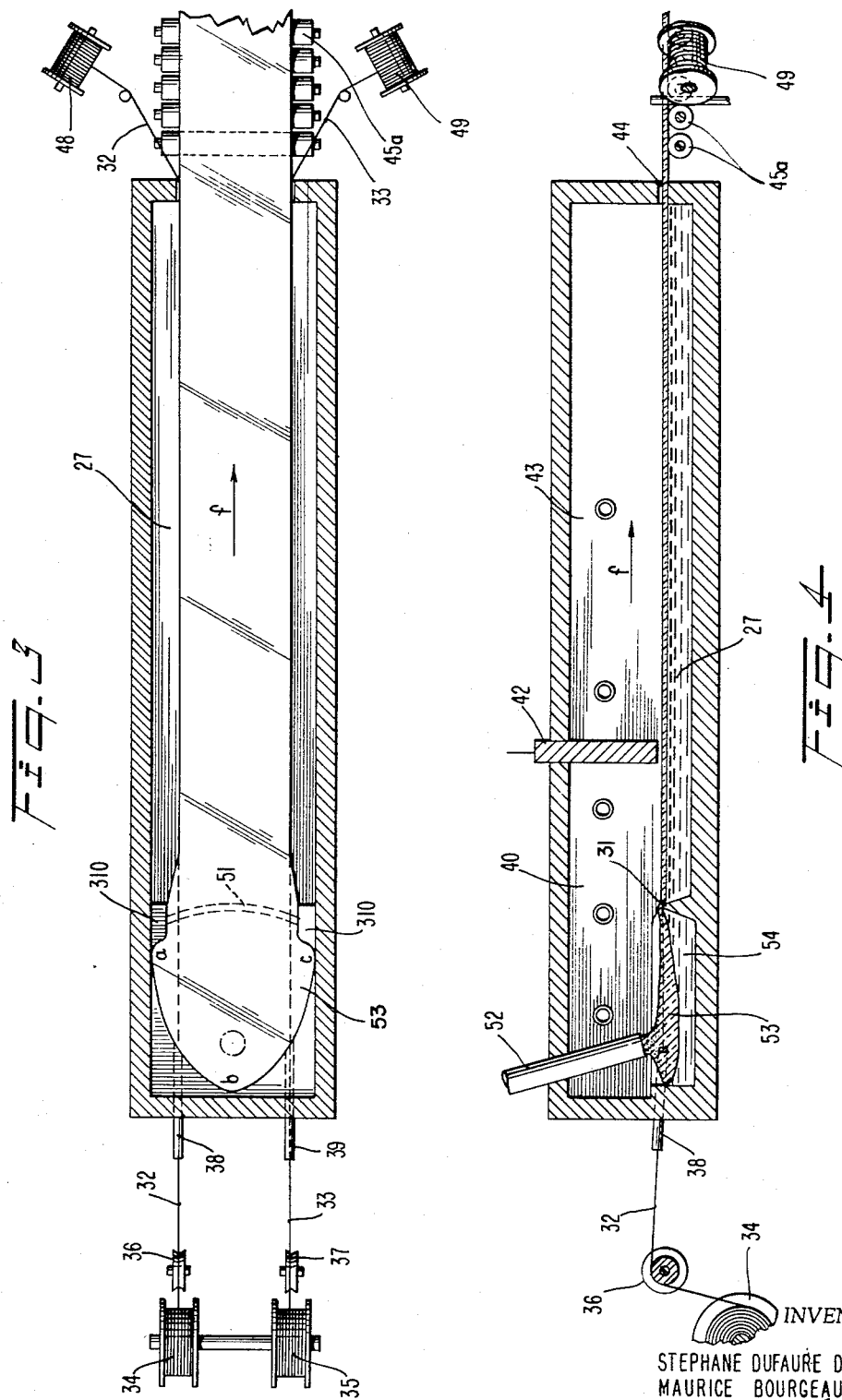

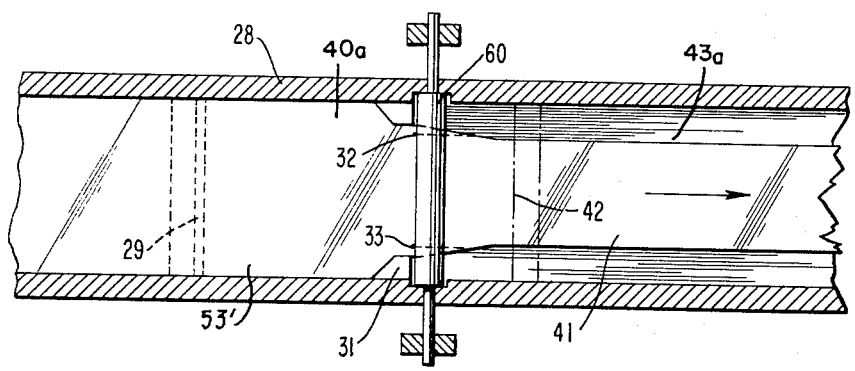
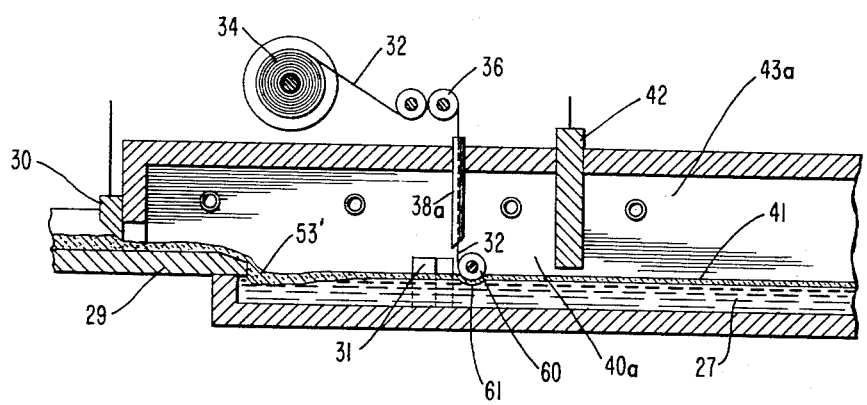

3,413,107
METHOD OF AND APPARATUS FOR THE MANUFACTURE OF FLAT GLASS ON A MOLTEN METAL BATH
Stephane Dufaure de Lajarte and Maurice Bourgeaux, Paris, France, assignors to Compagnie de Saint Gobain, Neuilly-sur-Seine, France
Filed Mar. 26, 1965, Ser. No. 442,942
Claims priority, application France, Apr. 2, 1964, 969,470
10 Claims. (Cl. 65—65)

ABSTRACT OF THE DISCLOSURE

Method and apparatus for the continuous production of sheet glass in ribbon form, by depositing molten glass directly, without rolling or like formation, onto one end of an elongated bath of molten metal to form a pool. A pair of filaments of heat-resisting metal are drawn under tension and in transversely-spaced relation, through guides which direct them into adhesive contact with respective side edges of the incipient ribbon at its exit from the pool. The filaments then pass as a unit with the ribbon, while plastic, over and along the surface of the molten metal, toward the exit end of the bath. A weir or roller, and side abutments restrict the flow of glass from the pool to form an incipient ribbon whose side edges adhere to the respective filaments. Rollers just outside the exit from the bath, draw the ribbon and filaments as a unit over and along the surface of the bath. The filaments are continuously separated from the ribbon after leaving the bath.

---

This invention relates to the manufacture of flat glass by the floatation process, in which the glass sheet is floated on the surface of a liquid bath, usually of molten metal, while it is sufficiently fluid to allow the surface to remove blemishes by the subsidence and flattening of minute irregularities, and to acquire a fire polish.

One of the difficulties which has attended the flotation process has been that of establishing and maintaining the lateral dimensions of the sheet. It is an object of this invention to overcome this difficulty.

In an application of earlier date, Ser. No. 359,921, now Patent No. 3,326,653, issued June 30, 1967, when the sheet of glass attains its final dimensions or afterward, the edges of the sheet are put into contact with flexible, parallel guides which are made of material which adheres to plastic glass and which move with the glass. Those guides adhere to the borders of the glass sheet, are under tension, and oppose any tendency of the glass to alter dimension. As molten glass on the surface of molten metal tends to assume a state, called dimensionally stabilized, under the forces of surface tension and gravity, the glass which is left free is usually stabilized at about 6.5 mm. thick when the molten metal is tin or a tin alloy. If the molten glass is laid on the metal in a thinner sheet it has a tendency to thicken and shrink laterally which is opposed by the guides, producing a sheet thinner and wider than a freely stabilized sheet.

According to our U.S. patent above identified the glass is delivered to the molten metal from between two shaping rollers in the form of a sheet or ribbon having its final dimension, the guides contacting the glass as or shortly after it leaves the rollers and moving with it until the glass has been fire polished, has assumed its final dimensions, and has been cooled to handling temperature, a viscosity at which it can be handled by the usual handling machinery for sheet glass without marring the surface. It then passes out of contact with the metal bath and is further cooled or treated as desired. This produces a sheet which is thinner than a freely stabilized sheet and which is held by the shaping rollers at the head end, by the guides at its longitudinal edges, and is drawn downstream by gripping rollers acting on the part which is cooled to handling temperature. The guides are separated from the glass at the end of the metal bath.

Objects of this invention are to improve the aforesaid process and apparatus and to introduce a novel process which is not dependent on shaping rollers or similar mechanisms for the thickness of the sheet.

An object of the present invention is to form the glass sheet and to shape it to its final dimensions on the surface of a molten metal bath. Another object is to provide an apparatus adapted to carry out the new process. Both the process and the apparatus have many novel steps and parts the purpose and function of which will be explained as the description proceeds.

It is particularly intended to introduce the glass to the bath above the place of introduction to the guides, and to form thin sheets of glass of chosen thickness on the surface of the molten bath.

The objects of the invention are accomplished, generally speaking, by a method of forming sheet glass which comprises flowing molten glass on the surface of a body of molten metal, drawing a sheet of glass from the deposited molten glass, maintaining the drawn sheet at fire polishing temperature, and cooling the sheet to handling temperature on molten metal and, in particular, by a method of making glass sheet by the flotation process which comprises forming the sheet initially on the surface of a molten bath, to dimensions wider than those desired in the final product, constricting the borders of the molten sheet laterally to those of the final product, stabilizing and fire polishing the sheet in its final dimensions, and cooling the sheet to handling temperature.

According to the present invention the molten glass is poured onto the liquid metal bath and into contact with retaining means composed of solid refractory material which is wetted by the glass, and guide elements under tension are continuously brought into contact with the molten glass and travel with it along the furnace, restraining it from lateral contraction under the force of surface tension.

In this apparatus the glass which is being formed into a sheet is retained throughout its perimeter by capillary adhesion, which acts at its upstream end to attach the glass to the retaining means, and laterally causes adhesion to the tensioned guiding means; downstream the fluid glass is retained by the parts of the sheet which are already hardened. It is thus possible, by regulating the quantity and controlling the expansion of the molten glass delivered to the molten metal, and by regulating the speed of the means which draws the glass through the apparatus, to produce a glass sheet, without preliminary rolling, which has any desired thickness, especially one less than that which is produced by stabilization under the forces of gravity and surface tension.

The glass thus being shaped into a sheet by the novel method to a desired thickness can be kept at this thickness as long as needed at high temperature (at or above 1000° C. for instance) in order that it shall have uniform thickness and a perfect fire polished surface.

The retaining elements may be composed of the usual refractories used in glass furnaces, of which alumina and sillimanite are excellent examples. The moving guides may be, e.g. wires, or groups of wires, or belts, or chains of refractory metals or metal alloys, examples of which are given in our U.S. patent previously identified and of which steel wire is one.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the diagrammatic drawings, wherein like reference characters refer to like parts throughout the several views, FIG. 1 is a plan view of the inside of one form of apparatus according to the invention;

FIG. 2 is a vertical, longitudinal section along the axis of FIG. 1;

FIG. 3 is a plan view of the inside of an advanced form of apparatus;

FIG. 4 is a vertical, longitudinal section along the axis of FIG. 3;

FIG. 5 is a plan view of the inside of a modification involving some of the novelty of FIG. 1 and some of that of FIG 3; and FIG. 6 is a vertical, longitudinal section along the axis of FIG. 5.

Off the figure, to the left of FIG. 1, is a melting furnace of ordinary type from which a stream of glass 25 flows along a channel 28 over a plate 29, into contact with a vertically adjustable doctor blade 30 which establishes the thickness of the stream of molten glass 26 which flows over the lip of plate 29 onto the surface of molten tin 27 which is contained in a tank 24 heated by standard means such as burners 23. A refractory roof or dome generally identified at 20 covers the tank according to good furnace practice, and a vertically adjustable baffle 42 enters through a slot in the dome and serves to separate the apparatus into upstream and downstream sections 40 and 43, respectively, which serve different purposes. The sheet of glass 41 is drawn over the molten bath by driven rollers 45 and leaves the apparatus through orifice 44 in its downstream end.

The stream of molten glass 26 is considerably thicker than final sheet 41 and in this example of carrying out the invention, the channel 28 is considerably wider than the final sheet. In order to reduce the width of the sheet the channel is reduced by side abutments 31 having guiding faces 31' inclined to the direction of flow of the glass to facilitate the formation of the sheet. These members or abutments 31 are downstream of the lip of plate 29 and beyond the place where the glass flows onto the surface of the molten metal. The plate 29 or at least its aforesaid front lip is made of a refractory material wetted by the molten glass in order to act as the upstream retaining means for the formation of the glass sheet on the molten metal according to the invention. The pull exerted by rollers 45, acting against the retarding effect of the plate 29, assists the sheet to assume its final thickness, which is no longer controlled only by gravity and surface tension but also by the tension exerted upon it.

The end of plate 29 rests on the upstream end of the tank 24 and tubes 38, 39 of small diameter extend through the tank wall beneath the plate in approximate alignment with the edges of the sheet 41. Reels 34, 35 and rollers 36 and 27 guide the respective wires 32, 33 into tubes 38, 39, and the tubes lead it into the molten glass. Rollers 36, 37 act as brakes to put an adjustable tension on the wires. In the course of the formation of the sheet the wires reach their position at the edges of the glass sheet where they are retained by capillary adhesion and are drawn with the glass sheet throughout the apparatus. The reels 48, 49 are mounted angularly offset and as the wires arrive at the point of discharge of the glass from the tank the pull exerted by said reels separates the wires from the glass without damage. The glass then goes on to other steps such as final cooling and cutting.

The temperature in the upstream section 40 is such that the glass is kept fluid, capable of being drawn to final thickness and width, capable of self-leveling its surface, and of fire polishing. This temperature, for ordinary window glass and the like is preferably between 1000° and 1200° C. This higher temperature is maintained by the greater number of burners 23 in the wall of the upstream section 40 than in downstream section 43. The section 43 is progressively cooled to a temperature at which the glass can be handled without damage to its surfaces, for instance 500°–600° C. for ordinary soda-lime glass. This lower temperature is indicated by the presence of fewer burners.

The apparatus of FIGS. 3 and 4 is of exceptional interest because it forms the sheet itself on the surface of the glass, not from a sheet already formed to uniform thickness but from a layer or pool of glass 53 which flows from a tube 52, connected at its upper end to a furnace, not shown, onto a pool of molten metal 54 which is retained behind a dam 51, which extends across the tank between guides 310 of construction similar to abutments 31, and within the curved sides $a$, $b$, $c$ of pool 53. As the molten glass flows onto the molten metal it spreads out as permitted by the walls $a$, $b$, $c$ to form a layer having a thickness greater than desired in the final sheet, and which may also be wider than the final sheet, as shown on the drawing. This mass is then drawn past the guides 310 and over the dam 51, which projects above or is level with the surface of the molten metal and acts as a brake. The driven rollers 45a draw out the sheet with the aid of surface tension and gravity to its final dimensions. Only enough pull need be used to move the sheet along the metal bath at its desired speed. The shape of the curve $a$, $b$, $c$ helps to prevent the formation of dead zones.

Wires 32, 33 are introduced into section 40 through tubes 38, 39 which penetrate the end wall at about the level of the top of dam 51, passing underneath the sides of glass mass 53 and becoming embedded in or adherent to the bottom of the glass as it passes over the dam.

In FIGS. 5 and 6 plate 29 is used to supply glass forming a pool 53' at the lip.

A roller 60 acting as the upstream retaining element dips into the glass and presses the glass against the metal as shown at 61 in FIG. 6. Tubes 38a supply wire from reels 34, 35 to the roller. The wires are pressed into the edges of the sheet and drawn along with the sheet. The effect of the roller 60 on the glass can be modified by changing its speed and the extent to which it dips into the glass. The operating conditions in sections 40a and 43a are the same for FIGS. 5 and 6 as for the other figures.

A novel feature of construction and method common to all the types of furnaces shown by the drawings is the upstream basin in which the glass is retained by various means and from which it is withdrawn by pulling. Thus the fluid glass, in a state sometimes called liquid as distinguished from plastic, is retained within a perimeter formed by an upstream retaining element, by the glass downstream which has been cooled and stiffened, and laterally by the moving guides. The thickness of the final sheet is determined for a given tension of the wires by the speed imparted to the downstream part of the sheet and the quantity of glass flowing on the liquid support.

The material advantages of the process are numerous and include the accomplishment of the objects above stated as well as the use of temperatures so high in the upstream perimeter that the glass, under gravity, surface tension and longitudinal tension, assumes a rigorously constant thickness and a perfectly plane and polished surface.

The following example illustrates the invention as applied to the manufacture of a sheet of ordinary window glass having the following composition:

$SiO_2$ ---------------------------------------- 72.4
$Al_2O_3$ -------------------------------------- 1.20
$Na_2O$ --------------------------------------- 14.16
$K_2O$ ---------------------------------------- 0.01

| | |
|---|---|
| CaO | 8.10 |
| MgO | 3.00 |
| $Fe_2O_3$ | 0.13 |
| $SO_3$ | 0.30 | obtained from a batch comprising the following elements:

| | Kg. |
|---|---|
| Sand | 819.06 |
| Soda carbonate | 235.68 |
| Soda sulfate | 49.38 |
| Limestone | 43.77 |
| Dolomie | 204.89 |
| Hydrated alumina | 15.85 |
| Carbone | 3.22 |
| Iron oxide | 1.22 |

1373 kg. of this batch will produce 1120 kg. of glass having the hereabove composition.

The molten glass at a temperature of about 1200° C. is fed through a tube 52 onto the molten tin bath in a furnace according to FIGURES 3 and 4.

According to a particular embodiment for carrying the invention with an apparatus of this type, the width of the part of the furnace situated upstream of the immersed curved dam 51 acting as the upstream retaining element for the formation of the glass sheet on the metal bath, is about 1 m. while the width of the downstream part of the furnace is about 0.80 m.

The length of the tank upstream of dam 51 is of the order of 0.85 m. and the length of the tank downstream of the dam 51 is about 5 m.

The adjustable baffle 42 is at about 1.70 m. from the upstream end wall of the furnace and divides the furnace into two sections, the upstream one in which the glass is at a temperature of about 1100° C. and the downstream one in which the glass is progressively cooled from about 1050° C. towards the temperature of 500° C. at which it can be handled without damages to its surfaces.

The wires 32, 33 of soft steel have a diameter of 1 mm. Their distance after the dam 51 is 0.60 m. corresponding to the width of the final sheet. The tension exerted of the wires by the breaking effect of rollers 36, 37 is 0.5 kg.

The thickness of the layer of glass deposited upstream the dam 51 is about 25 mm. and the final thickness of the glass sheet issuing from the furnace is of 3.8 mm.

The speed of drawing imparted to the glass sheet is 1.40 m./minute and the quantity of glass fed to the bath is 11.5 tons per day.

As many apparently widely different embodiments of the present invention may be made without departing from the spirit and scope thereof, it is to be understood that the invention is not limited to the specific embodiments.

What is claimed is:

1. A method of forming sheet glass which comprises flowing molten glass directly upon a bath of molten flotation material, thereby forming a supply of glass on the flotation material from which a glass sheet may be formed, drawing a definitive sheet of glass from said supply over said bath and progressively shaping it to predetermined dimensions of width and thickness by introducing tensioned flexible linear guides through the said supply into contact with the edges of the definitive sheet, said linear guides being composed of material adherent to the glass, cooling the sheet on the bath, removing it from the bath, and separating the guides therefrom.

2. A method of forming sheet glass which comprises flowing molten glass directly upon a liquid support, forming a definitive sheet of glass on the liquid support from the said glass on the liquid support by passing such glass into contact with a retaining member which is made of refractory material wetted by molten glass which extends over the entire predetermined width of the sheet, and introducing flexible guides adherent to the glass under tension into the molten glass on both sides of the retaining member at a distance from each other such as to determine the final width of the glass sheet, the plastic glass being thus retained throughout its perimeter by the retaining member, the tensioned guide means, and the already hardened part of the ribbon, the final dimensions of the ribbon being determined by controlling the flow of molten glass to the liquid support, the lateral tension of the guides, and the traction exerted on the glass ribbon.

3. A method according to claim 2 in which the shaping of the sheet from said supply is by drawing it over a weir.

4. A method according to claim 2 in which the shaping of the sheet from said supply is by drawing over a dam level with the flotation of the flotation liquid.

5. A method according to claim 2 wherein the sheet is shaped from said supply by pressing it from above into the flotation bath.

6. A method according to claim 5 in which the sheet is pressed and the linear guides are introduced to the sheet by a roller between which and the flotation bath the sheet is formed.

7. Apparatus for the manufacture of a ribbon of glass comprising a liquid support for molten glass, means for feeding molten glass on to said liquid support to form a sort of reservoir on the liquid support, a retaining member made of a refractory material wetted by the molten glass positioned to contact the whole initial width of the sheet drawn from the reservoir, means for feeding into the molten glass on both sides of the retaining member continuous lengths of flexible solid material, under tension, contiguous to each edge of the ribbon of glass, means for moving the flexible material under continuing tension in contact with the glass, and means to draw a ribbon of glass from the reservoir so that the glass travels with, and is guided by, the flexible material, at a speed convenient for a given flow of glass, over the liquid support thereby producing the required initial width and thickness of the glass ribbon, and preventing stabilization, means for cooling the ribbon, and means to separate the guides therefrom.

8. Apparatus according to claim 7 in which the sheet forming means comprises a linear dam or weir.

9. Apparatus according to claim 7 in which the sheet forming means comprises a roller positioned to bear upon the forming sheet.

10. Apparatus according to claim 7 in which the sheet forming means comprises a refractory plate over which the molten glass flows into the pool from which the sheet or ribbon is drawn.

References Cited

UNITED STATES PATENTS

| | | | |
|---|---|---|---|
| 3,241,939 | 3/1966 | Michalik | 65—65 |
| 3,264,081 | 8/1966 | Pilkington | 65—99 |
| 3,326,651 | 6/1967 | Javaux | 65—182 X |
| 3,326,653 | 6/1967 | Lajarte et al. | 65—65 |

DONALL H. SYLVESTER, *Primary Examiner.*

ARTHUR D. KELLOGG, *Assistant Examiner.*